United States Patent [19]

Maruyama

[11] Patent Number: 5,464,951
[45] Date of Patent: Nov. 7, 1995

[54] TABLET UNIT COMPRISING A REDUCED NUMBER OF CIRCUIT ELEMENTS

[75] Inventor: Seiichi Maruyama, Sano, Japan

[73] Assignee: Mitsumi Electric Co., Ltd., Tokyo, Japan

[21] Appl. No.: 143,452

[22] Filed: Oct. 26, 1993

[30] Foreign Application Priority Data

Oct. 27, 1992 [JP] Japan ................................. 4-074737 U

[51] Int. Cl.$^6$ .................................................. G08C 21/00
[52] U.S. Cl. .................................................................. 178/18
[58] Field of Search ................................. 178/18, 19, 20; 345/156; 364/709.01, 709.10, 709.11

OTHER PUBLICATIONS

"New Tablet Utilizing Matteuci Effect of Amorphous Magnetic Wires"; Magnetics Research Conference of Institute of Electric and Electronic Engineering (Mag-91-158), Aug. 23, 1991; pp. 33-41.

Primary Examiner—Stephen Chin
Assistant Examiner—Paul Loomis
Attorney, Agent, or Firm—Frishauf, Holtz, Goodman, Langer & Chick

[57] ABSTRACT

In a tablet unit comprising a plurality of X-axis magnetic wires and a plurality of Y-axis magnetic wires arranged on a tablet board in a matrix fashion for detecting an abscissa and an ordinate, respectively, each of the plurality of X-axis and Y-axis magnetic wires is made of an amorphous material. The plurality of X-axis magnetic wires are divided into first through N-th groups. Any one of the X-axis magnetic wires belonging to a particular group is arranged to adjoin two other X-axis magnetic wires belonging to different groups to form a specific combination of three different groups so that those X-axis magnetic wires belonging to the particular group are spaced from one another by at least a predetermined distance and that the specific combination is unique and does not repeatedly appear. The X-axis magnetic wires belonging to each group are connected to one another in series or in parallel. The plurality of Y-axis magnetic wires are utilized in the manner similar to that of the plurality of X-axis magnetic wires. A switching circuit successively and selectively put the plurality of X-axis and Y-axis magnetic wires group by group into the electroconductive state in a predetermined cycle.

6 Claims, 12 Drawing Sheets

| MAXIMUM OUTPUT GROUP | ADJOINING GROUP | MAGNETIC WIRE |
|---|---|---|
| GX 1 | GX 2 | WX 0 |
| GX 2 | GX 3 | WX 1 |
| GX 3 | GX 4 | WX 2 |
| GX 4 | GX 5 | WX 3 |
| GX 5 | GX 6 | WX 4 |
| GX 6 | GX 7 | WX 5 |
| GX 7 | GX 8 | WX 6 |
| GX 8 | GX 9 | WX 7 |
| GX 9 | GX 10 | WX 8 |
| GX 10 | GX 11 | WX 9 |
| GX 11 | GX 1 | WX 10 |
| GX 1 | GX 3 | WX 11 |
| GX 3 | GX 5 | WX 12 |
| GX 5 | GX 7 | WX 13 |
| GX 7 | GX 9 | WX 14 |
| GX 9 | GX 11 | WX 15 |
| GX 11 | GX 2 | WX 16 |
| GX 2 | GX 4 | WX 17 |
| GX 4 | GX 6 | WX 18 |
| GX 6 | GX 8 | WX 19 |
| GX 8 | GX 10 | WX 20 |
| GX 10 | GX 1 | WX 21 |
| GX 1 | GX 4 | WX 22 |
| GX 4 | GX 7 | WX 23 |
| GX 7 | GX 10 | WX 24 |
| GX 10 | GX 2 | WX 25 |
| GX 2 | GX 5 | WX 26 |
| GX 5 | GX 8 | WX 27 |
| GX 8 | GX 11 | WX 28 |
| GX 11 | GX 13 | WX 29 |
| GX 3 | GX 6 | WX 30 |

FIG. 6

| MAXIMUM OUTPUT GROUP | ADJOINING GROUP | MAGNETIC WIRE |
|---|---|---|
| GX 6 | GX 9 | WX 31 |
| GX 9 | GX 1 | WX 32 |
| GX 1 | GX 5 | WX 33 |
| GX 5 | GX 9 | WX 34 |
| GX 9 | GX 2 | WX 35 |
| GX 2 | GX 6 | WX 36 |
| GX 6 | GX 10 | WX 37 |
| GX 10 | GX 3 | WX 38 |
| GX 3 | GX 7 | WX 39 |
| GX 7 | GX 11 | WX 40 |
| GX 11 | GX 4 | WX 41 |
| GX 4 | GX 8 | WX 42 |
| GX 8 | GX 1 | WX 43 |
| GX 1 | GX 6 | WX 44 |
| GX 6 | GX 11 | WX 45 |
| GX 11 | GX 5 | WX 46 |
| GX 5 | GX 10 | WX 47 |
| GX 10 | GX 4 | WX 48 |
| GX 4 | GX 9 | WX 49 |
| GX 9 | GX 3 | WX 50 |
| GX 3 | GX 8 | WX 51 |
| GX 8 | GX 2 | WX 52 |
| GX 2 | GX 7 | WX 53 |
| GX 7 | GX 2 | WX 54 |

FIG. 7

TABLET UNIT COMPRISING A REDUCED NUMBER OF CIRCUIT ELEMENTS

BACKGROUND OF THE INVENTION

This invention relates to a tablet unit and, in particular, to a tablet unit using magnetic wires made of an amorphous material for detection of a coordinate.

A conventional tablet unit adopts a coordinate detection system generally classified into an electrostatic coupling system or a magnetic system. In place of these systems, a novel tablet unit recently proposed makes use of the Matteuci effect of an amorphous magnetic wire (hereinafter simply referred to as a magnetic wire). Such a novel tablet unit is proposed in an article entitled "New Tablet Utilizing Matteuci Effect of Amorphous Magnetic Wires" and contributed to Magnetics Research Conference of Institute of Electric and Electronic Engineering (MAG-91-158, Aug. 23, 1991).

As will later be described in detail, the tablet unit disclosed in the above-mentioned article makes use of the Matteuci effect that a magnetic wire generates a pulse voltage when a magnetic field is excited by an alternating current in a direction perpendicular to the magnetic wire. The tablet unit comprises, as a coordinate detector, a plurality of magnetic wires arranged on a tablet board along a X-axis direction and a Y-axis direction in a matrix fashion. In the following description, the magnetic wires parallel to an X axis are called X-axis magnetic wires while the magnetic wires parallel to a Y axis are called Y-axis magnetic wires. Each of the X-axis and the Y-axis magnetic wires has one end connected to a switching circuit successively supplied with selection signals from a selection circuit for selectively putting the X-axis and the Y-axis magnetic wires into an electroconductive state. The other end of each of the X-axis and the Y-axis magnetic wires is connected to a detection circuit. The detection circuit is for detecting a particular one of the X-axis magnetic wires and a particular one of the Y-axis magnetic wires when the particular ones are indicated as a coordinate by a coordinate indicator pen during the electroconductive state. On the other hand, the switching circuit supplies selection pulse signals successively to the X-axis and the Y-axis magnetic wires in a predetermined cycle to thereby carry out a scanning operation. The switching circuit includes a plurality of switching elements in one-to-one correspondence to the X-axis and the Y-axis magnetic wires.

Generally, the number of the magnetic wires are not less than fifty in each of the X-axis and the Y-axis directions. Accordingly, the total number of the switching elements exceeds one hundred for both the X-axis and the Y-axis directions. This results in a substantial increase of the cost. It is assumed here that the number of the magnetic wires in each of the X-axis and the Y-axis directions is equal to n while each selection pulse signal has a period T. In this event, a scanning period is equal to nT because all of the X-axis and the Y-axis magnetic wires are scanned one by one in the above-mentioned tablet unit. Accordingly, the scanning period inevitably becomes long with the increase of the number of the magnetic wires.

SUMMARY OF THE INVENTION

It is therefore a primary object of this invention to provide a tablet unit which can reduce the number of switching elements in a switching circuit.

It is another object of this invention to provide a tablet unit which can reduce a scanning period for magnetic wires.

It is a further object of this invention to provide a tablet unit which can achieve a simplified connection structure between magnetic wires and peripheral circuits.

On describing the gist of this invention, it is possible to understand that a tablet unit comprises a plurality of X-axis magnetic wires and a plurality of Y-axis magnetic wires arranged at a predetermined pitch on a tablet board in a matrix fashion for detecting an abscissa and an ordinate, respectively, each of the plurality of X-axis and Y-axis magnetic wires being made of an amorphous material, a switching circuit supplied with a selection signal for selectively putting the plurality of X-axis and Y-axis magnetic wires into an electroconductive state in accordance with the selection signal, and a detecting circuit connected to the plurality of X-axis and Y-axis magnetic wires for detecting a particular one of the plurality of X-axis magnetic wires and a particular one of the plurality of Y-axis magnetic wires when the particular ones are indicated as a coordinate by a coordinate indicator pen during the electroconductive state.

According to this invention, the plurality of X-axis magnetic wires are divided into first through N-th (N being an integer not smaller than two) groups. Any one of the X-axis magnetic wires belonging to a particular group is arranged to adjoin two other X-axis magnetic wires belonging to different groups to form a specific combination of three different groups so that those X-axis magnetic wires belonging to the particular group are spaced from one another by at least a predetermined distance and that the specific combination is unique and does not repeatedly appear. The plurality of Y-axis magnetic wires are divided into first through N-th (N being an integer not smaller than two) groups. Any one of the Y-axis magnetic wires belonging to a particular group is arranged to adjoin two other X-axis magnetic wires belonging to different groups to form a specific combination of three different groups so that those Y-axis magnetic wires belonging to the particular group are spaced from one another by at least the predetermined distance and that the specific combination is unique and does not repeatedly appear. The X-axis magnetic wires belonging to each group are connected to one another in series or in parallel. The Y-axis magnetic wires belonging to each group are connected to one another in series or in parallel. The switching circuit successively and selectively puts the plurality of X-axis and Y-axis magnetic wires group by group into the electroconductive state in a predetermined cycle.

BRIEF DESCRIPTION OF THE DRAWING

FIG. 6 shows a part of a group combination table preliminarily stored in a CPU in conjunction with the arrangement illustrated in FIG. 5;

FIG. 7 shows a remaining part of the group combination table illustrated in FIG. 6;

DESCRIPTION OF THE PREFERRED EMBODIMENTS

Figure 1:
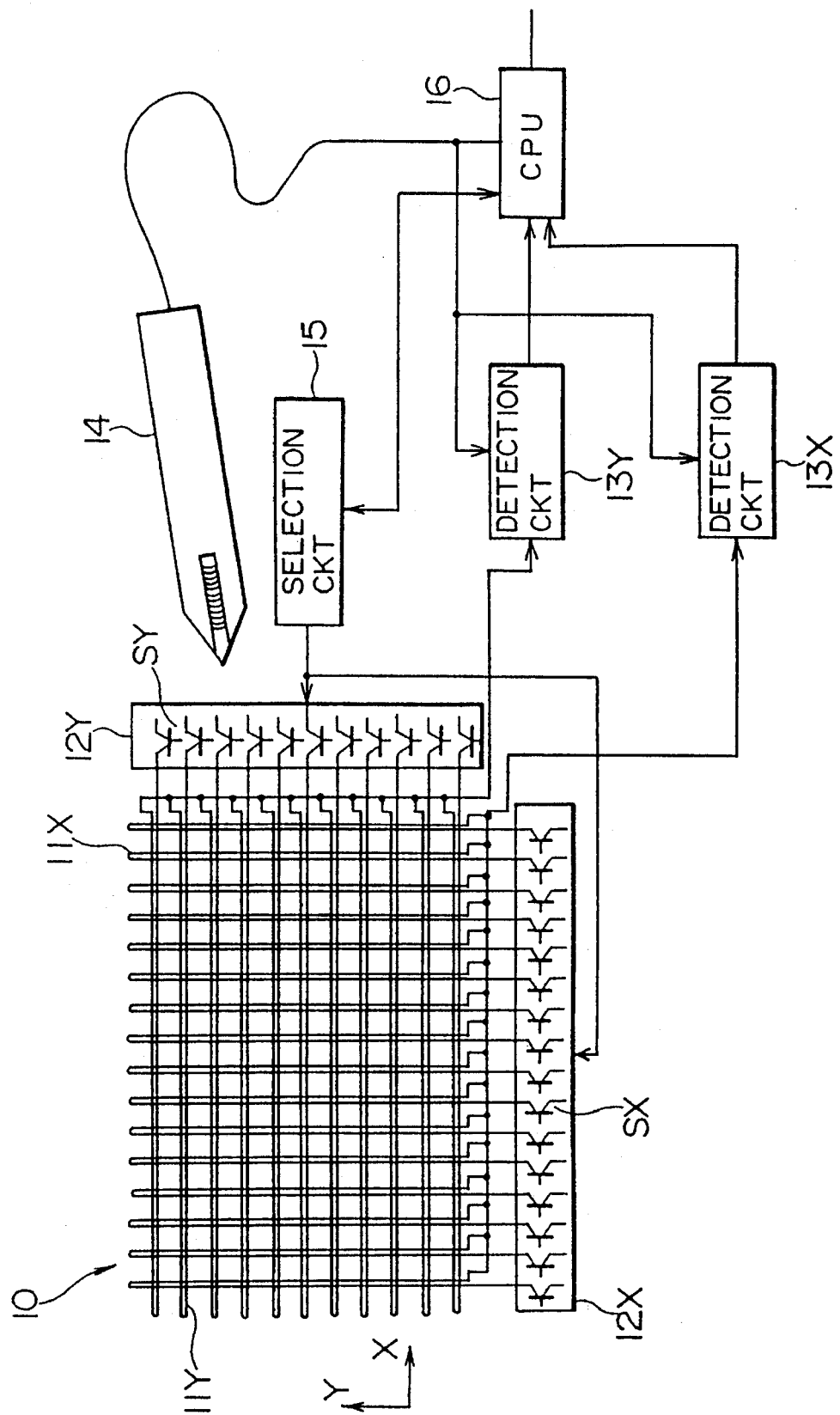
FIG. 1 shows a schematic diagram of a conventional tablet unit.

Referring to FIG. 1, a conventional tablet unit will at first be described for a better understanding of this invention. The conventional tablet unit is disclosed in the article referred to in the preamble of the specification. The conventional tablet unit comprises a tablet board 10 and a plurality of X-axis and Y-axis magnetic wires 11X and 11Y arranged on the tablet board 10 in a matrix fashion along X-axis and Y-axis directions, respectively. The X-axis magnetic wires 11X have one ends connected to a switching circuit 12X and the other ends connected to a common line which is connected to a detection circuit 13X. Likewise, the Y-axis magnetic wires 11Y have one ends connected to a switching circuit 12Y and the other ends connected to a common line which is connected to a detection circuit 13Y. A coordinate indicator pen 14 generates alternating magnetic field through its top end. Each of the X-axis and the Y-axis magnetic wires generates a pulse voltage due to the Matteuci effect when it is touched by the coordinate indicator pen 14.

The switching circuit 12X comprises a plurality of switching elements SX connected to the X-axis magnetic wires 11X in one-to-one correspondence. Supplied from a selection circuit 15 with selection pulse signals of a predetermined period, the switching elements SX are successively and selectively turned into an on state for a short time interval. As a consequence, the X-axis magnetic wires 11X connected to the switching elements SX are successively and selectively put into an electroconductive state for a short time interval. This operation is equivalent to a scanning operation in principle. When a particular one of the X-axis magnetic wires generates a pulse voltage due to the Matteuci effect, the pulse voltage can only be detected while the particular one is put into the electroconductive state. A scanning cycle for each X-axis magnetic wire is defined as a lapse of time between the time instants when it is put into the electroconductive state and when it is again put into the electroconductive state. The scanning cycle is determined by a period T of the selection pulse signal and the number n of the X-axis magnetic wires and is equal to nT. Accordingly, the scanning period becomes long with the increase of the number of the X-axis magnetic wires. The similar operation is carried out in the switching circuit 12Y.

The detection circuit 13X is for detecting whether or not the pulse voltage is generated by one of the X-axis magnetic wires 11X that is currently put into an electroconductive state.

As described in the above-referenced article, an abscissa of a particular position indicated by the coordinate indicator pen 15 is determined with reference to the output of a particular one of the X-axis magnetic wires 11X that exhibits a maximum level and the outputs of two other wires adjacent to the particular one.

The detection circuit 13X detects the particular one that exhibits a maximum level as a detected X-axis magnetic wire. The detection circuit 13Y carries out a similar operation to detect, as a detected Y-axis magnetic wire, a particular one of the Y-axis magnetic wires 11Y that exhibits a maximum output level.

A CPU 16 controls the selection circuit 15 and the detection circuits 13X and 13Y to make the selection circuit 15 produce the selection pulse signals and to make the detection circuits 13X and 13Y carry out a detecting operation in synchronism with excitation of the magnetic field by an alternating current produced from the coordinate indicator pen 15. With reference to serial numbers assigned to the detected X-axis and Y-axis magnetic wires, the CPU 16 determines an X-Y coordinate corresponding to the particular position on the tablet board 10 that is indicated by the coordinate indicator pen 15.

Generally, the number of the X-axis magnetic wires 11X is not less than fifty. Likewise, the number of the Y-axis magnetic wires 11Y is not less than fifty. Accordingly, the number of the switching elements SX and SY exceeds one hundred in total. This results in a substantial increase of the cost. With the increase of the number of the X-axis and the Y-axis magnetic wires, the scanning period inevitably becomes long because all of the X-axis and the Y-axis magnetic wires are scanned one by one in the above-mentioned tablet unit.

Figure 2:
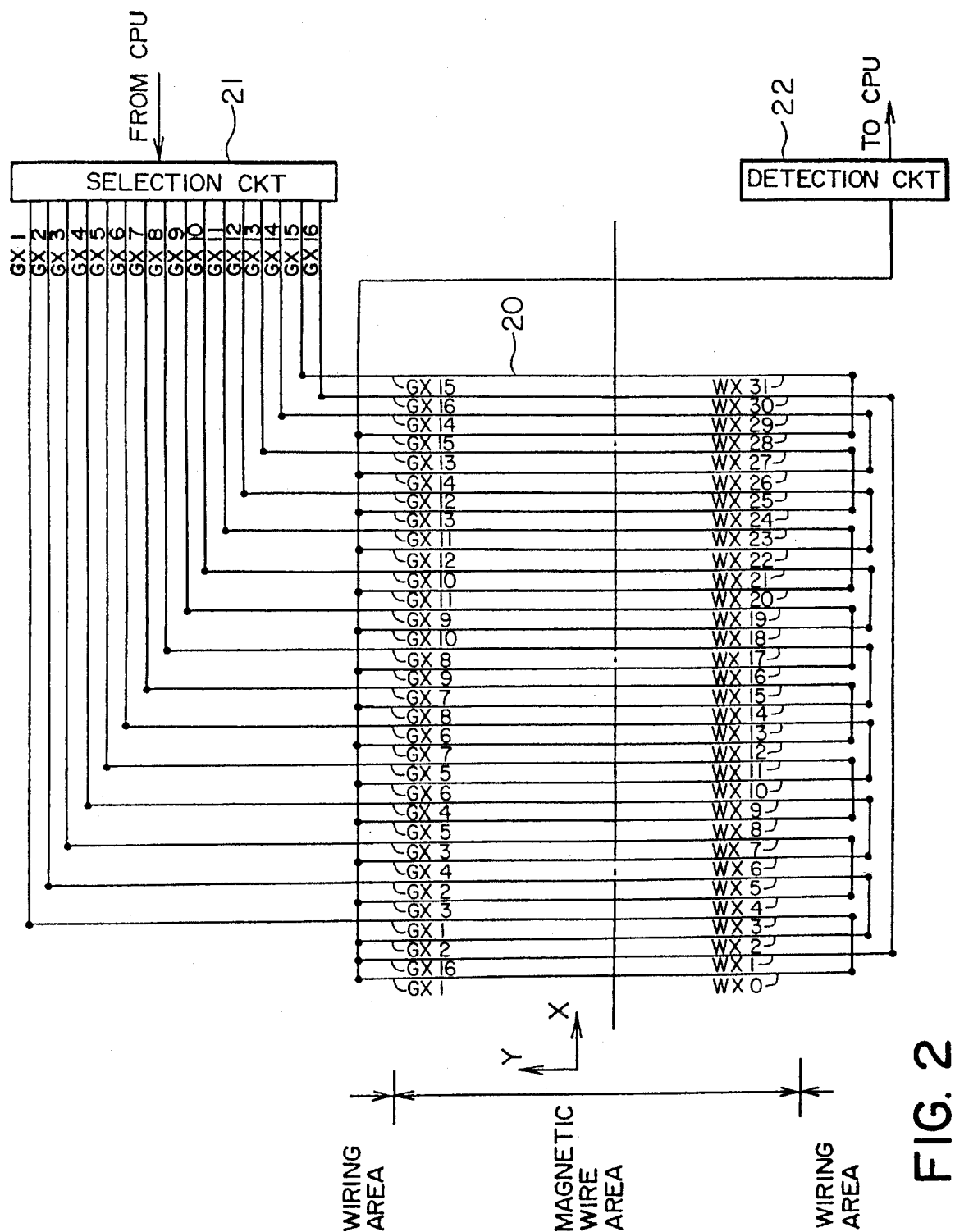
FIG. 2 shows an arrangement of a plurality of X-axis magnetic wires and peripheral circuits according to a first embodiment of this invention.

Now referring to FIG. 2, description will be made as regards a first embodiment of this invention. FIG. 2 shows a part of a tablet unit according to this invention. The tablet unit comprises an X-axis wire arrangement 20 including a plurality of X-axis magnetic wires, a selection circuit 21, and a detection circuit 22. The selection circuit 21 and the detection circuit 22 are connected to the X-axis wire arrangement 20. In the illustrated embodiment, the X-axis wire arrangement 20 includes a plurality of X-axis magnetic wires WX0 through WX31, 32 in number. The X-axis magnetic wires WX0 through WX 31 are divided into first through sixteenth groups GX1 through GX16 each of which comprises two X-axis magnetic wires. The X-axis magnetic wires WX0 through WX31 are mounted in parallel to one another on a transparent flexible sheet at a predetermined pitch. As will be described later in detail, the flexible sheet is connected to a printed circuit board provided with wiring patterns for connection between the X-axis magnetic wires WX0 through WX31 and the selection circuit 21 and another wiring patterns for connection between the X-axis magnetic wires WX0 through WX31 and the detection circuit 22.

In this embodiment, the first group GX1 comprises the X-axis magnetic wires WX0 and WX3 connected in series and spaced from each other with two other wires interposed therebetween. In other words, the X-axis magnetic wires WX0 and WX3 are spaced from each other at a distance corresponding to three times the predetermined pitch. The second group GX2 comprises the X-axis magnetic wires WX2 and WX5 connected in series and spaced from each other with two other wires interposed therebetween. Likewise, the third through the sixteenth groups GX3 through GX16 comprise the X-axis magnetic wires WX4 and WX7 (GX3), WX6 and WX9 (GX4), WX8 and WX11 (GX5), WX10 and WX13 (GX6), WX12 and WX15 (GX7), WX14 and WN17 (GX8), WX16 and WX19 (GX9), WX18 and WX21 (GX10), WX20 and WX23 (GX11), WX22 and WX25 (GX12), WX24 and WX27 (GX13), WX26 and WX29 (GX14), WX28 and WX31 (GX15), and WX1 and WX30 (GX16), respectively.

Although not illustrated in the figure, the selection circuit 21 comprises a switching circuit and a wire selection circuit as described in conjunction with FIG. 1. The switching circuit includes first through sixteenth switching elements. The wire selection circuit supplies selection pulse signals successively to the first through the sixteenth switching elements in a fixed cycle to selectively turn the first through the sixteenth switching elements into an on state. The first through the sixteenth switching elements correspond to the first through the sixteenth groups GX1 through GX16, respectively. Specifically, the first through the sixteenth switching elements are connected to one ends of the X-axis magnetic wires WX3, WX5, WX7, WX9, WX11, WX13, WX15, WX17, WX19, WX21, WX23, WX25, WX27, WX29, WX31, and WX30 belonging to the first through the sixteenth groups GX1 through GX16, respectively. On the other hand, one ends of the other X-axis magnetic wires WX0, WX1, WX2, WX4, WX6, WX8, WX10, WX10, WX12, WX14, WX16, WX18, WX20, WX22, WX24, WX26, WX28 are connected to a common line which is in turn connected to the detection circuit 22. The detection circuit 22 is connected to a CPU (not shown). The CPU has a memory device which memorizes a combination table representative of a relationship between two adjoining groups and a particular one of the X-axis magnetic wires to be detected.

Description will proceed to a detecting operation in the above-described arrangement in conjunction with the first group GX1. When a first selection pulse signal is supplied to the first switching element in the selection circuit 21, the first switching element is turned into an on state. Consequently, the X-axis magnetic wires WX0 and WX3 belonging to the first group GX1 are simultaneously put into an electroconductive state. When a coordinate indicator pen (not shown) touches either the X-axis magnetic wire WX0 or WX3 during the electroconductive state, one of the X-axis magnetic wires WX0 and WX3 that is touched by the coordinate indicator pen generates a pulse voltage. The pulse voltage is detected by the detection circuit 22. It is noted here that the X-axis magnetic wires WX0 and WX3 in the first group GX1 do not simultaneously generate the pulse voltage because they are sufficiently spaced from each other. The CPU connected to the detection circuit 22 recognizes the order of supply of the selection pulse signals. It is assumed here that a maximum pulse voltage having a maximum output level is detected by the detection circuit 22 when the first pulse selection signal is supplied to the first switching element corresponding to the first group GX1. In this event, the CPU judges that the maximum pulse voltage is generated by one of the X-axis magnetic wires WX0 and WX3 belonging to the first group GX1. In order to detect an abscissa indicated by the coordinate indicator pen, the CPU not only monitors the maximum pulse voltage generated by one of the X-axis magnetic wires but also a lower pulse voltage generated by an adjoining one of the X-axis magnetic wires.

It is assumed that the coordinate indicator pen touches the X-axis magnetic wire WX3. In this event, the X-axis magnetic wire WX3 generates the maximum pulse voltage. Each of the X-axis magnetic wires WX2 and WX4 adjoining the X-axis magnetic wire WX3 generates the lower pulse voltage having an output level lower than that of the maximum pulse voltage. The lower pulse voltage generated by the X-axis magnetic wire WX2 is detected by the detection circuit 22 when the second switching element is turned into an on state in response to a second selection pulse signal and the X-axis magnetic wires WX2 and WX5 in the second group GX2 are put into an electroconductive state. Thus, the maximum output level is detected in the first group GX1 while the lower output level is detected in the second group GX2. In this event, the CPU judges that the first and the second groups GX1 and GX2 adjoin each other. It is again noted here that the lower pulse voltage is generated by an X-axis magnetic wire adjoining a particular X-axis magnetic wire which produces the maximum pulse voltage. Taking this into consideration, the CPU judges that the above-mentioned situation is obtained by a combination of the X-axis magnetic wires WX3 and WX2, neither by a combination of the X-axis magnetic wires WX0 and WX2 nor by a combination of the X-axis magnetic wires WX3 and WX5. Thus, the CPU judges that the X-axis magnetic wire WX3 generates the maximum pulse voltage.

The tablet unit can detect the abscissa even if the coordinate indicator pen touches an intermediate position between two IX-axis magnetic wires. The method of detection is described in detail in the article referred to in the preamble of the specification. Thus, the tablet unit is capable of detecting the abscissa with a fine resolution smaller than the predetermined pitch of the X-axis magnetic wires.

In the foregoing embodiment, the magnetic wires, 32 in number, are divided into the first through the sixteenth groups. Each group comprises two X-axis magnetic wires spaced from one another. Any one of the X-axis magnetic wires belonging to a particular group is arranged to adjoin two other X-axis magnetic wires belonging to different groups to form a specific combination of three different groups so that those X-axis magnetic wires belonging to the particular group are spaced from one another by at least a predetermined distance and that the specific combination is unique and does not repeatedly appear. The predetermined distance is longer than twice the predetermined pitch. With this arrangement, it is possible to identify one X-axis magnetic wire which generates the maximum pulse voltage when the two X-axis magnetic wires in the same group are simultaneously put into an electroconductive state by a common single switching element. Thus, the abscissa is detected. As a result, the switching elements in the selection circuit 21 can be reduced from thirty-two to sixteen in number, as compared with the conventional tablet unit. It is readily understood that the scanning period is also reduced to a half of the scanning period in the conventional tablet unit.

Figure 3:
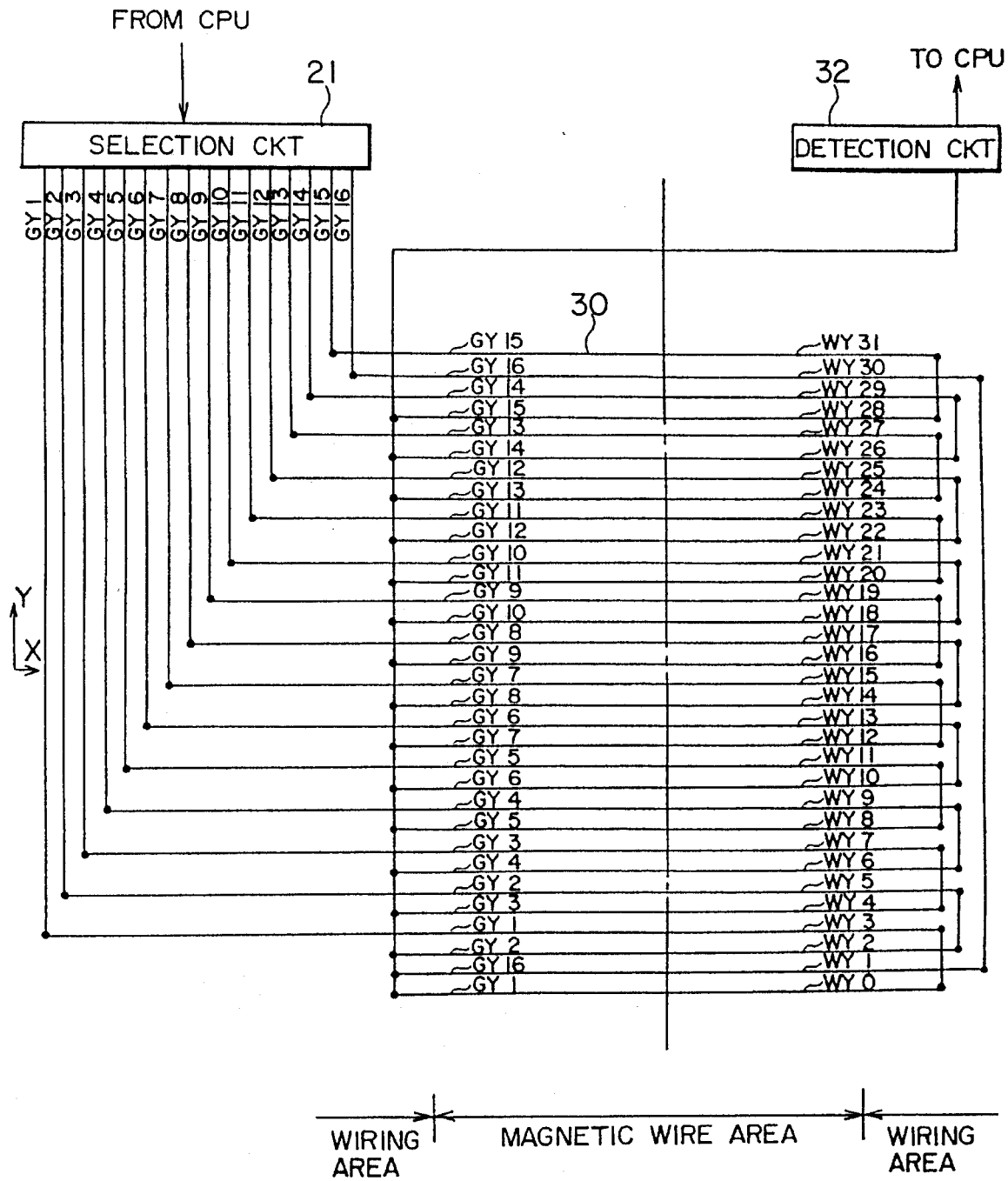
FIG. 3 shows an arrangement of a plurality of Y-axis magnetic wires and peripheral circuits according to the first embodiment of this invention.

FIG. 3 shows a Y-axis wire arrangement 30 for use in detection of an ordinate. The Y-axis wire arrangement 30 is combined with the X-axis wire arrangement 20 illustrated in FIG. 2. The Y-axis wire arrangement 30 is connected to the selection circuit 21 and a detection circuit 32 and comprises a plurality of Y-axis magnetic wires WY0 through WY31, 32 in number. The Y-axis magnetic wires WY0 through WY31 are divided into first through sixteenth groups each of which comprises two Y-axis magnetic wires. The Y-axis magnetic wires WY0 through WY31 are mounted in parallel to one another on a transparent flexible sheet at a predetermined pitch in the manner similar to the X-axis magnetic wires illustrated in FIG. 2. The flexible sheet having the Y-axis wire arrangement 30 is overlapped with the flexible sheet having the X-axis wire arrangement 20 so that the X-axis magnetic wires and the Y-axis magnetic wires perpendicularly intersect each other. The flexible sheet having the Y-axis wire arrangement 30 is connected to a printed circuit board provided with wiring patterns for connection between the Y-axis magnetic wires WY0 through WY31 and the selection circuit 21 and another wiring patterns for connection between the Y-axis magnetic wires WY0 through WY31 and the detection circuit 32.

In the manner similar to that described in conjunction with FIG. 2, the first group GY1 comprises the Y-axis magnetic wires WY0 and WY3 connected in series and spaced from each other with two other wires interposed therebetween. In other words, the Y-axis magnetic wires WY0 and WY3 are spaced from each other at a distance corresponding to three times the predetermined pitch. The second group GY2 comprises the Y-axis magnetic wires WY2 and WY5 connected in series and spaced from each other with two other wires interposed therebetween. Likewise, the third through the sixteenth groups GY3 through GY16 comprise the Y-axis magnetic wires WY4 and WY7 (GY3), WY6 and WY9 (GY4), WY8 and WY11 (GY5), WY10 and WY13 (GY6), WY12 and WY15 (GY7), WY14 and WN17 (GY8), WY16 and WY19 (GY9), WY18 and WY21 (GY10), WY20 and WY23 (GY11), WY22 and WY25 (GY12), WY24 and WY27 (GY13), WY26 and WY29 (GY14), WY28 and WY31 (GY15), and WY1 and WY30 (GY16), respectively.

The first through the sixteenth switching elements in the selection circuit 21 correspond to the first through the sixteenth groups GY1 through GY16, respectively. Specifically, the first through the sixteenth switching elements are connected to one ends of the Y-axis magnetic wires WY3, WY5, WY7, WY9, WY11, WY13, WY15, WY17, WY19, WY21, WY23, WY25, WY27, WY29, WY31, and WY30 belonging to the first through the sixteenth groups GY1 through GY16, respectively. These Y-axis magnetic wires are successively and selectively put into an electroconductive state in response to the first through the sixteenth selection pulse signals described in conjunction with FIG. 2. On the other hand, one ends of the other Y-axis magnetic wires WY0, WY1, WY2, WY4, WY6, WY8, WY10, WY10, WY12, WY14, WY16, WY18, WY20, WY22, WY24, WY26, WY28 are connected to a common line which is in turn connected to the detection circuit 32. The detection circuit 32 is connected to the CPU (not shown). The memory device of the CPU memorizes a combination table representative of a relationship between two adjoining groups and a particular one of the Y-axis magnetic wires to be detected.

The detecting operation for the ordinate in the above-mentioned arrangement is quite similar to that described with reference to FIG. 2 in conjunction with the detecting operation of the abscissa. Accordingly, no further description is made.

Figure 4:
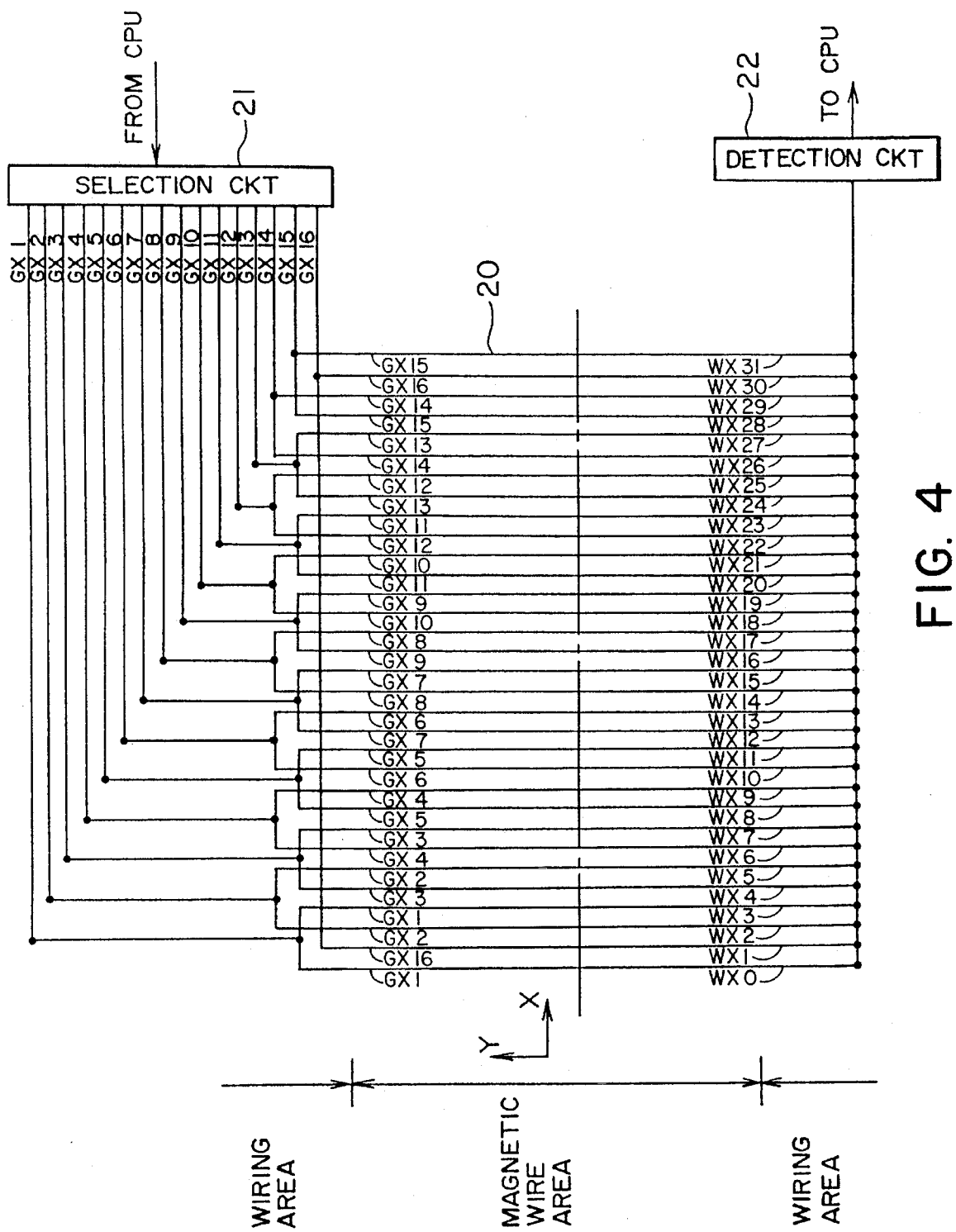
FIG. 4 shows an arrangement of a plurality of X-axis magnetic wires and peripheral circuits according to a second embodiment of this invention.

FIG. 4 shows a second embodiment which is a modification of the first embodiment illustrated in FIG. 2. Referring to FIG. 4, two X-axis magnetic wires belonging to each of the first through the sixteenth groups GX1 through GX16 are connected in parallel. An arrangement of the X-axis magnetic wires belonging to each group and a combination of two adjoining X-axis magnetic wires in two adjoining groups are similar to those illustrated in FIG. 2. As is different from FIG. 2, two X-axis magnetic wires belonging to each group have one ends connected through a common line to the first through the sixteenth switching elements in the selection circuit 21. On the other hand, the other ends of all of the X-axis magnetic wires are connected through a common line to the detection circuit 22. The detecting operation of the abscissa and the effect are similar to the embodiment illustrated in FIG. 2 and will not be described.

The X-axis wire arrangement 20 illustrated in FIG. 4 is combined with a plurality of the Y-axis magnetic wires for detection of the ordinate. The Y-axis magnetic wires has an arrangement similar to that illustrated in FIG. 3 except that the two Y-axis magnetic wires belonging to each of the first through the sixteenth groups GY1 through GY16 are connected in parallel. Accordingly, illustration and description thereof will be omitted. The selection circuit and the detection circuit connected to the Y-axis magnetic wires are also similar to those described in conjunction with FIG. 3.

Figure 5:
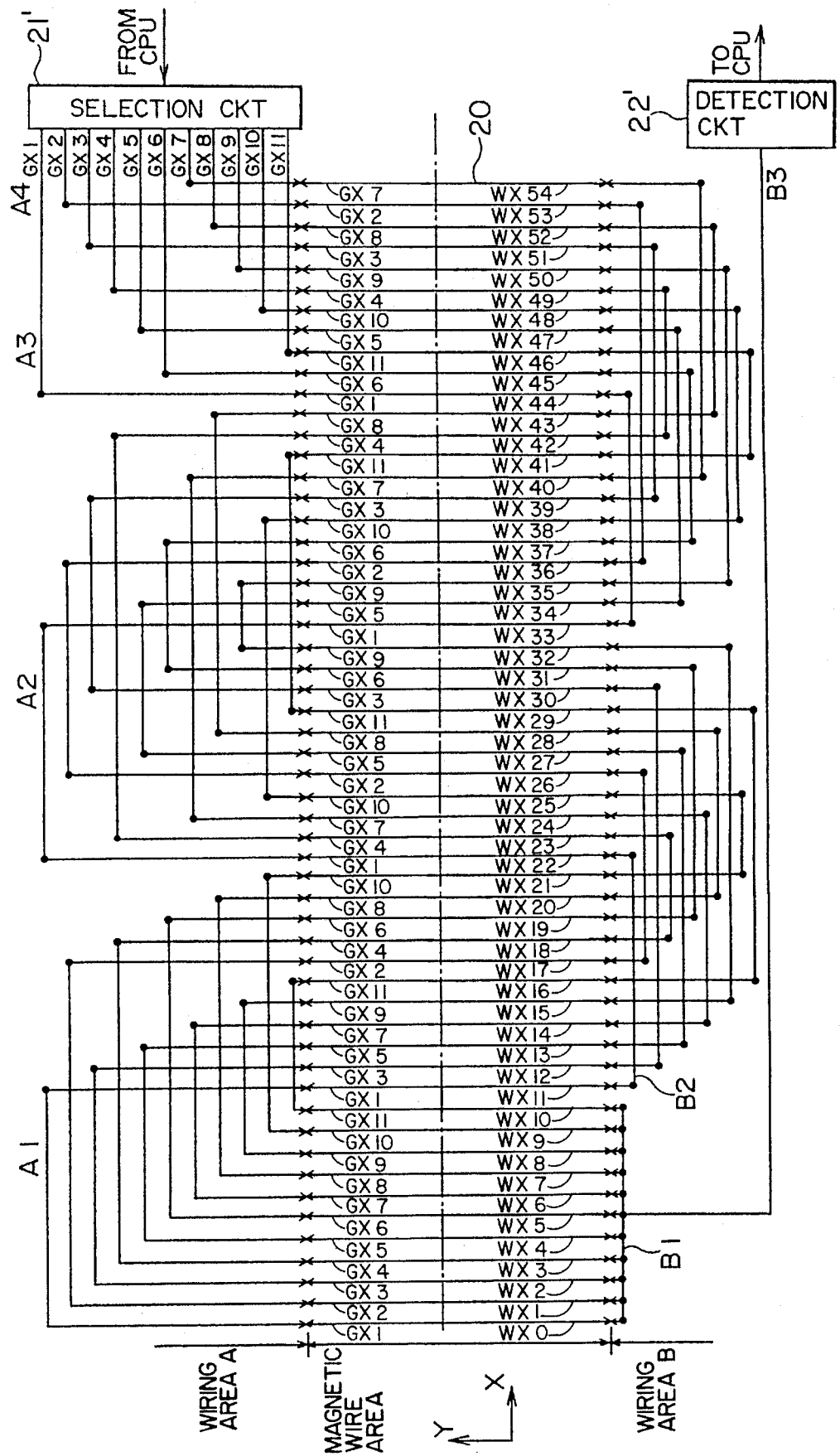
FIG. 5 shows an arrangement of a plurality of X-axis magnetic wires and peripheral circuits according to a third embodiment of this invention.

FIG. 5 shows a third embodiment of this invention which is another modification of the first embodiment illustrated in FIG. 2. Referring to FIG. 5, a plurality of X-axis magnetic wires WX0 through WX54, 55 in number, are divided into first through eleventh groups GX1 through GX11 each of which comprises five X-axis magnetic wires connected in series.

Specifically, the first group GX1 comprises the X-axis magnetic wires WX44-WX33-WX22-WX11-WX0 connected in series in this order to a first switching element (not shown) in a selection circuit 21'. Likewise, the second through the eleventh groups GX2 through GX11 comprise the X-axis magnetic wires WX53-WX36-WX26-WX17-WX1 (GX2), WX51-WX39-WX30-WX12-WX2 (GX3), WX49-WX42-WX23-WX18-WX3 (GX4), WX47-WX34-WX27-WX13-WX4 (GX5), WX45-WX37-WX31-WX19-WX5 (GX6), WX54-WX40-WX24-WX14-WX6 (GX7), WX52-WX43-WX28-WX20-WX7 (GX8), WX50-WX35-WX32-WX15-WX8 (GX9), WX48-WX38-WX25-WX21-WX9 (GX10), and WX46-WX41-WX29-WX16-WX10 (GX11) connected in series in this order to second through eleventh switching elements in the selection circuit 21', respectively. The last X-axis magnetic wires WX0 through WX10 in the first through the eleventh groups GX1 through GX11 have the other ends connected to a common line which in turn is connected to the detection circuit 22'.

The X-axis magnetic wires are mounted on a transparent flexible sheet in parallel to one another at a predetermined pitch. The flexible sheet is connected to a printed circuit board provided with wiring patterns for connection between the X-axis magnetic wires WX0 through WX54 and the selection circuit 21' and another wiring patterns for connection between the X-axis magnetic wires WX0 through WX54 and the detection circuit 22'.

In this arrangement also, any one of five X-axis magnetic wires belonging to a particular group is arranged to adjoin two other X-axis magnetic wires belonging to different groups to form a specific combination of three different groups so that those X-axis magnetic wires belonging to the particular group are spaced from one another by at least the predetermined distance and that the specific combination is unique and does not repeatedly appear. Accordingly, the detecting operation of the abscissa is similar in principle to that described in conjunction with FIG. 2.

It is assumed here that the first switching element in the selection circuit 21' is turned into an on state in response to a first pulse selection signal when the coordinate indicator pen touches the X-axis magnetic wire WX44. The X-axis magnetic wire WX44 generates a maximum pulse voltage having a maximum output level which is supplied through the X-axis magnetic wires WX33, WX22, WX11, and WX0 belonging to the first group G1 and through the detection circuit 22' to the CPU. The CPU judges that the maximum pulse voltage is generated by any one of the X-axis magnetic wires belonging to the first group GX1. On the other hand, a lower pulse voltage having a level lower than that of the maximum output level is generated by the X-axis magnetic wires G45 and G43 adjoining the X-axis magnetic wire G44. When the sixth switching element corresponding to the sixth group GX6 is turned into an on state in response to the sixth pulse selection signal, the lower pulse voltage generated by the X-axis magnetic wire WX45 belonging to the sixth group GX6 is detected. The CPU judges that the lower pulse voltage is generated by any one of the X-axis magnetic wires belonging to the sixth group GX6. When the eighth switching element corresponding to the eighth group GX8 is turned into an on state in response to the eighth pulse selection signal, the lower pulse voltage generated by the X-axis magnetic wire WX43 belonging to the eighth group GX8 is detected. The CPU judges that the lower pulse voltage is generated by any one of the X-axis magnetic wires belonging to the eighth group GX8.

Thus, the CPU judges that the maximum output level is obtained in the first group GX1 and that a particular X-axis magnetic wire in the first group GX1 to be detected adjoins one of the X-axis magnetic wires belonging to each of the sixth and the eighth groups GX6 and GX8. Based on this judgment, the CPU determines that the X-axis magnetic wire to be detected is WX44 with reference to the combination table preliminarily stored.

FIGS. 6 and 7 show a combination table representative of combinations of a maximum output group generating a maximum pulse voltage and one of adjoining groups adjoining the maximum output group. In the foregoing embodiment, the maximum output group is G1 while the adjoining group is G6. With reference to the combination table, the X-axis magnetic wire to be detected is identified as WX44 (in a fourteenth row from the top of the combination table in FIG. 7).

With the structure shown in FIG. 5, the switching elements in the selection circuit 21' can be reduced from fifty-five to eleven in number, as compared with the conventional tablet unit. The scanning period can be reduced to one fifth of that of the conventional tablet unit.

Figure 8:
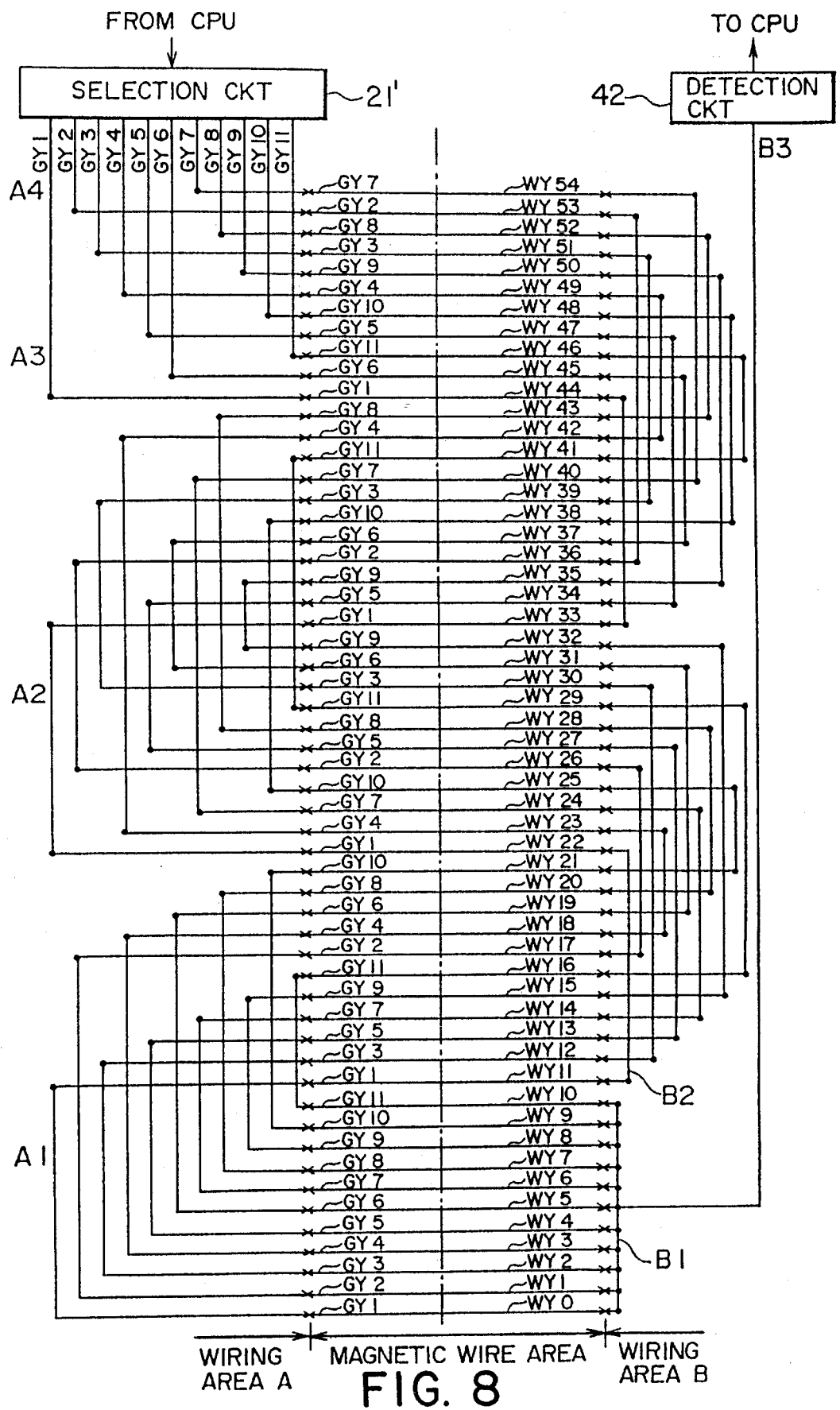
FIG. 8 shows an arrangement of a plurality of Y-axis magnetic wires and peripheral circuits for use in combination with the arrangement illustrated in FIG. 5.

FIG. 8 shows a Y-axis wire arrangement 30 for use in detection of an ordinate. The Y-axis wire arrangement 30 is combined with the X-axis wire arrangement 20 illustrated in FIG. 5. The Y-axis wire arrangement 30 is connected to the selection circuit 21' and a detection circuit 42 and comprises a plurality of Y-axis magnetic wires WY0 through WY54, 55 in number. The Y-axis magnetic wires WY0 through WY54 are divided into first through eleventh groups each of which comprises five Y-axis magnetic wires. The Y-axis magnetic wires WY0 through WY54 are mounted in parallel to one another on a transparent flexible sheet at a predetermined pitch, in the manner similar to the X-axis magnetic wires illustrated in FIG. 5. The flexible sheet having the Y-axis wire arrangement 30 is overlapped with the flexible sheet having the X-axis wire arrangement 20 so that the X-axis magnetic wires and the Y-axis magnetic wires perpendicularly intersect each other. As described in conjunction with FIG. 3, the flexible sheet having the Y-axis wire arrangement 30 is connected to a printed circuit board provided with wiring patterns for connection between the Y-axis magnetic wires WY0 through WY54 and the selection circuit 21' and another wiring patterns for connection between the Y-axis magnetic wires WY0 through WY54 and the detection circuit 42.

Figure 9:
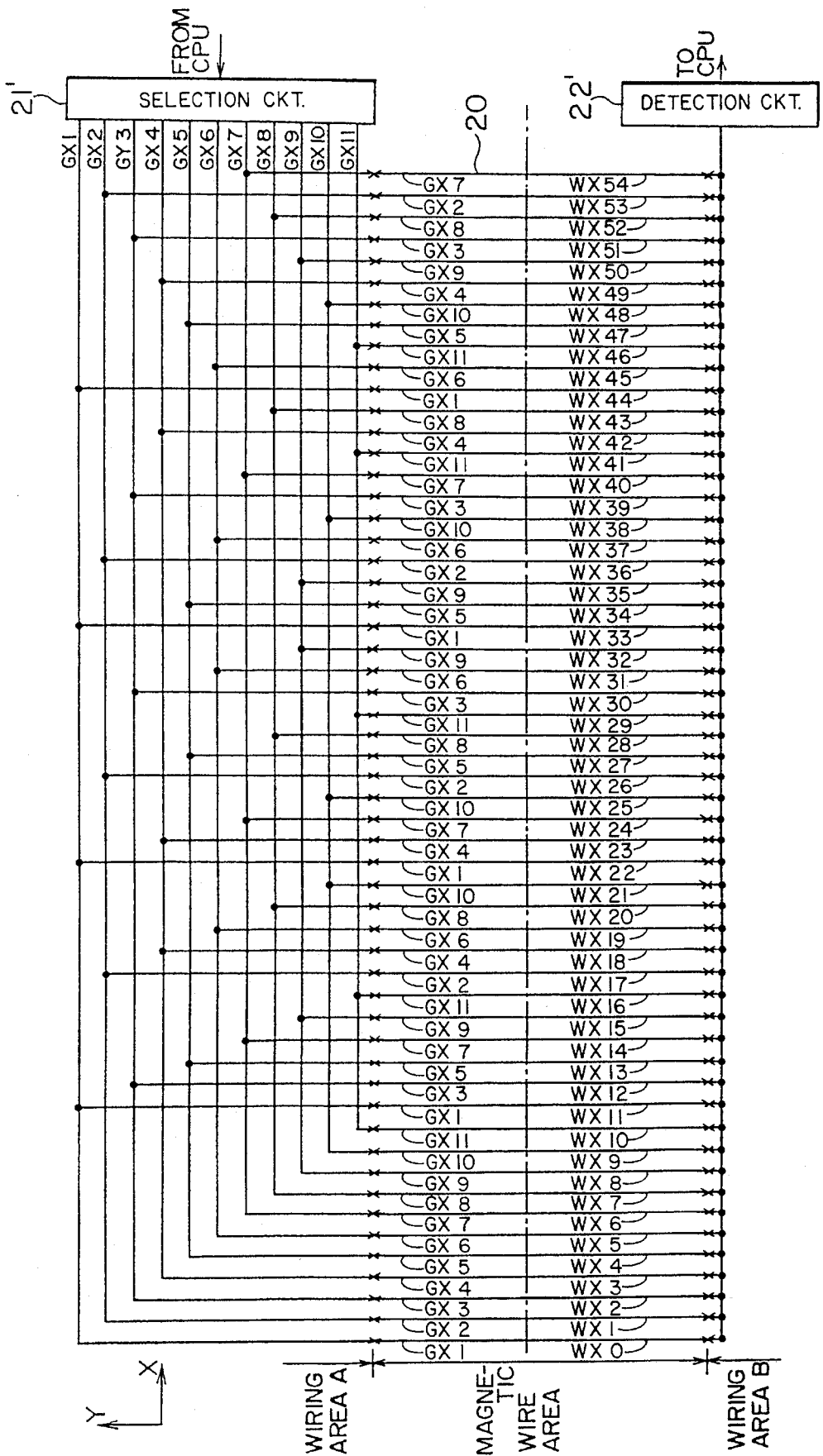
FIG. 9 shows an arrangement of a plurality of X-axis magnetic wires and peripheral circuits according to a fourth embodiment of this invention.

FIG. 9 shows a fourth embodiment of this invention which is a modification of the third embodiment illustrated in FIG. 5. Referring to FIG. 5, five X-axis magnetic wires belonging to each of the first through the eleventh groups GX1 through GX11 are connected in parallel. The detecting operation for the abscissa and the effect are similar to the embodiment illustrated in FIG. 5 and will not be described.

In any one of the foregoing embodiments, the X-axis magnetic wires are mounted on an under side of the transparent flexible sheet. The flexible sheet is folded back at an intermediate portion depicted by a dash-and-dot line in the figure into a double-folded structure having an upper layer and a lower layer with the X-axis magnetic wires located inside. With reference to the embodiment illustrated in FIG. 5, the upper half and the lower half of the X-axis magnetic wires WX0 through WX54 are located on the upper layer and the lower layer, respectively. A wiring area A between the selection circuit 21' and the X-axis magnetic wires WX0 through WX54 is implemented by a first printed circuit board (not shown) provided with wiring patterns illustrated in the figure. On the other hand, a wiring area B between the detection circuit 22' and the X-axis magnetic wires WX0 through WX54 is implemented by a second printed circuit board (not shown) provided with wiring patterns illustrated in the figure. One ends of the upper half of the X-axis magnetic wires WX0 through WX54 are connected to corresponding ends of the wiring patterns on the first printed circuit board at positions depicted by x. Likewise, one ends of the lower half of the X-axis magnetic wires WX0 through WX54 are connected to corresponding ends of the wiring patterns on the second printed circuit board at positions depicted by x. In the above-mentioned connection structure, however, two printed circuit boards having different wiring patterns as illustrated in the wiring areas A and B are required. This results in increase of both the mounting space and the cost.

In view of the above, this invention uses a double-sided printed circuit board provided with wiring patterns on upper and under sides thereof. Thus, a single printed circuit board is sufficient.

Figure 10:
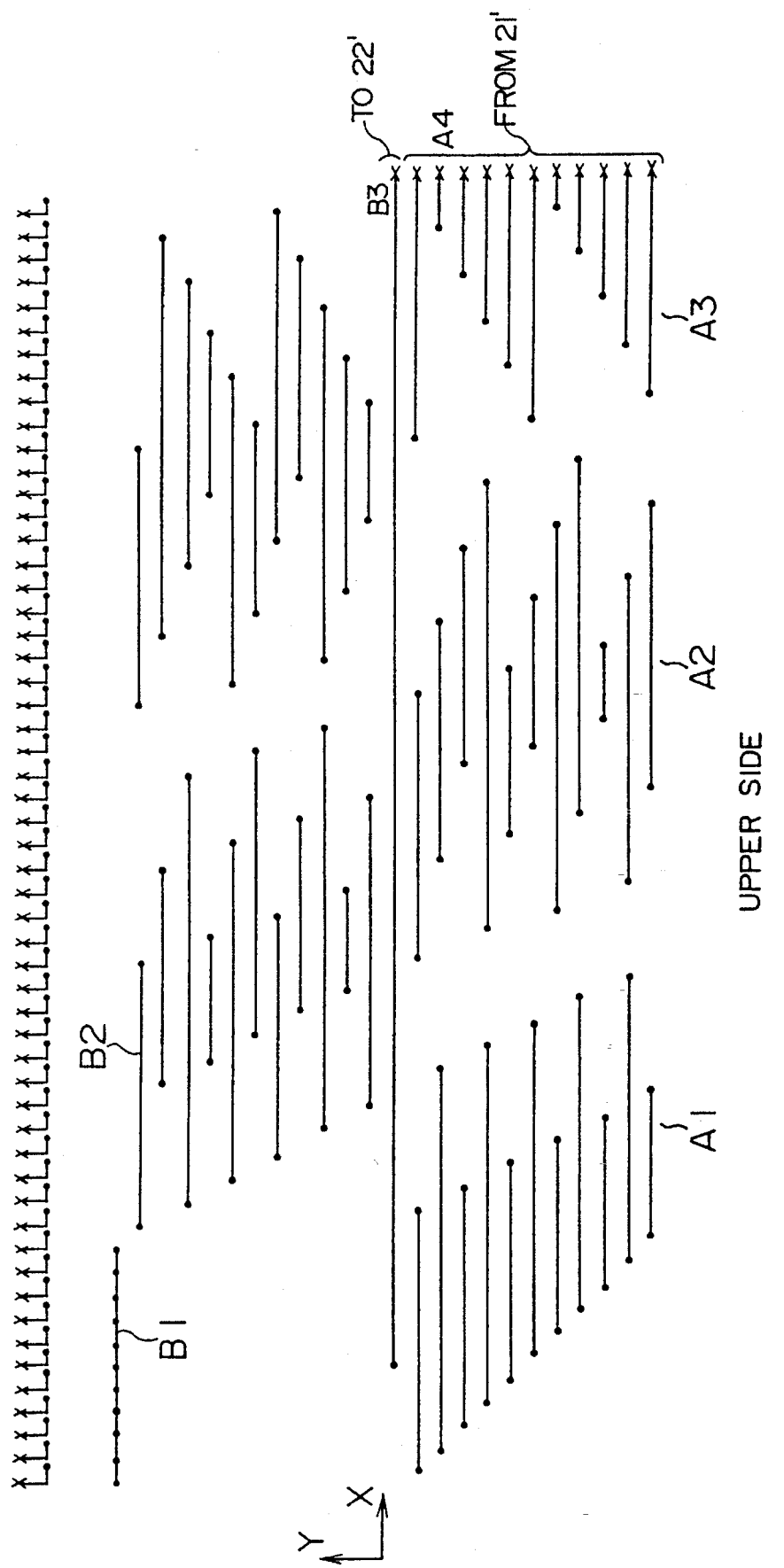
FIG. 10 shows an X-axis partial pattern group formed on an upper side of a double-sided printed circuit board to realize wiring patterns in a wiring area illustrated in FIG. 5.
Figure 11:
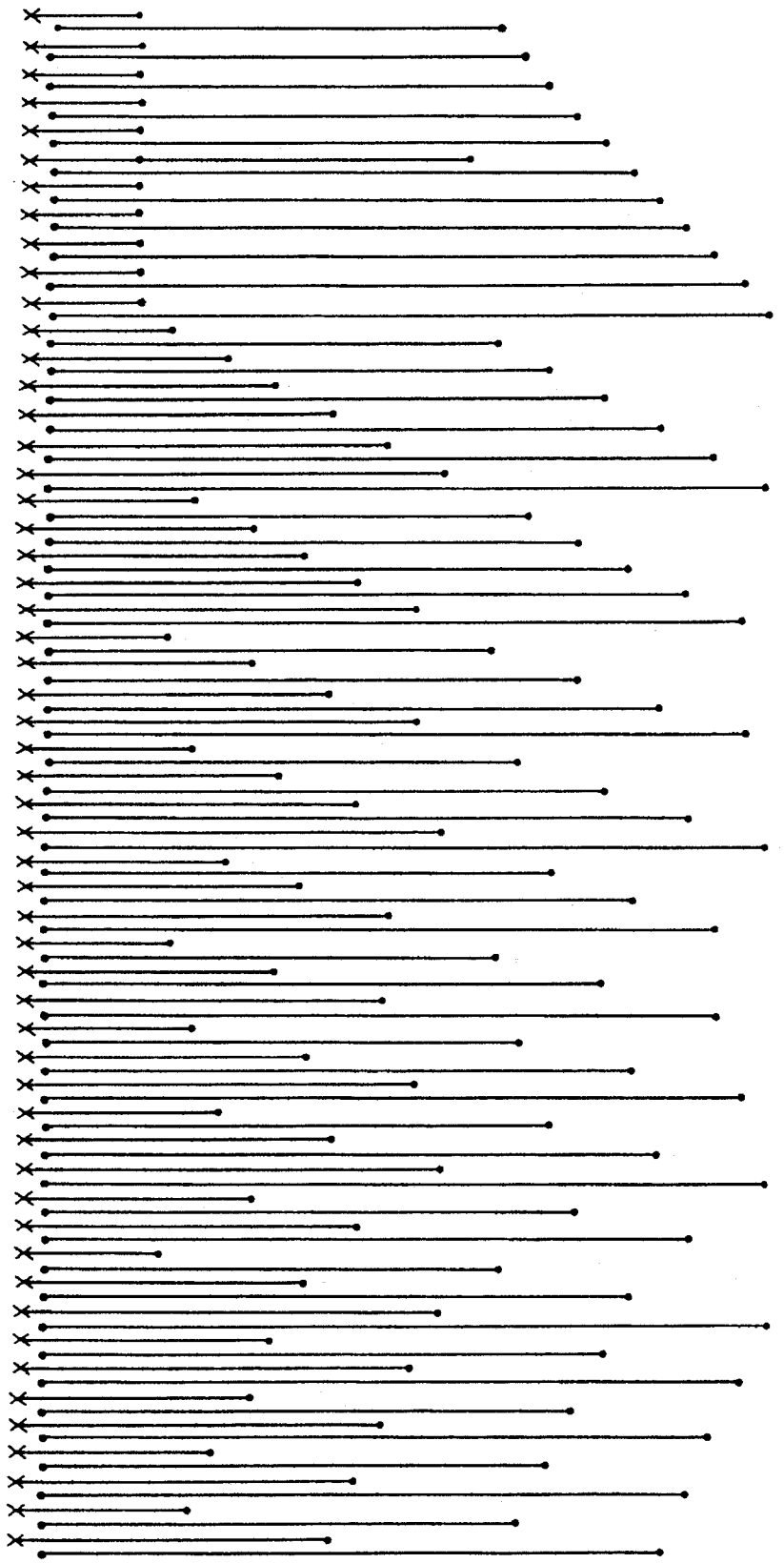
FIG. 11 shows a Y-axis partial pattern group formed on an under side of the double-sided printed circuit board to realize the wiring patterns in the wiring area illustrated in FIG. 5.

FIGS. 10 and 11 show examples of wiring patterns formed on the double-sided printed circuit board according to this invention. In the figures, X-axis partial pattern groups composing the wiring patterns formed in the wiring areas A and B in FIG. 5 are illustrated. Referring to FIG. 10, a first X-axis partial pattern group formed on the upper side of the double-sided printed circuit board comprises perpendicular patterns perpendicular to an extending direction of the X-axis magnetic wires WX0 through WX54. Referring to FIG. 11, a second X-axis partial pattern group is formed on the under side of the double-sided printed circuit board and comprises parallel patterns parallel to the extending direction of the X-axis magnetic wires WX0 through WX54.

In FIG. 10, reference symbols x illustrated at the top of the figure represent connection points between the wiring area A and the X-axis magnetic wires WX0 through WX54 illustrated in FIG. 5. Small black circles represent through holes for connection between the first and the second X-axis partial pattern groups formed on the upper and the under sides of the double-sided printed circuit board.

In FIG. 11, reference symbols x illustrated at the top of the figure represent connection points between the wiring area B and the X-axis magnetic wires WX0 through WX54 illustrated in FIG. 5. Small black circles represent through holes for connection between the first X-axis partial pattern groups formed on the upper and the under sides of the double-sided printed circuit board. The through holes are identical with those illustrated in FIG. 10 but viewed from the under side. For reference, areas corresponding to partial areas A1, A2, A3, and A4 and B1, B2, B3, and B4 illustrated in FIG. 5 are depicted in FIG. 10 by the similar reference symbols.

Thus, the first (perpendicular) and the second (parallel) X-axis partial pattern groups formed on the upper and the under sides of the double-sided printed circuit board are connected to each other via the through holes formed at the ends of the wiring patterns and depicted by the black small circles. Thus, the wiring patterns in the wiring areas A and B in FIG. 5 can be formed on the single double-sided printed circuit board. Such a structure is also applicable to the Y-axis magnetic wires by the use of another double-sided printed circuit board. Description and illustration about the wiring patterns for the Y-axis magnetic wires will be omitted because they are substantially identical to those described above in conjunction with the X-axis magnetic wires.

Figure 12:
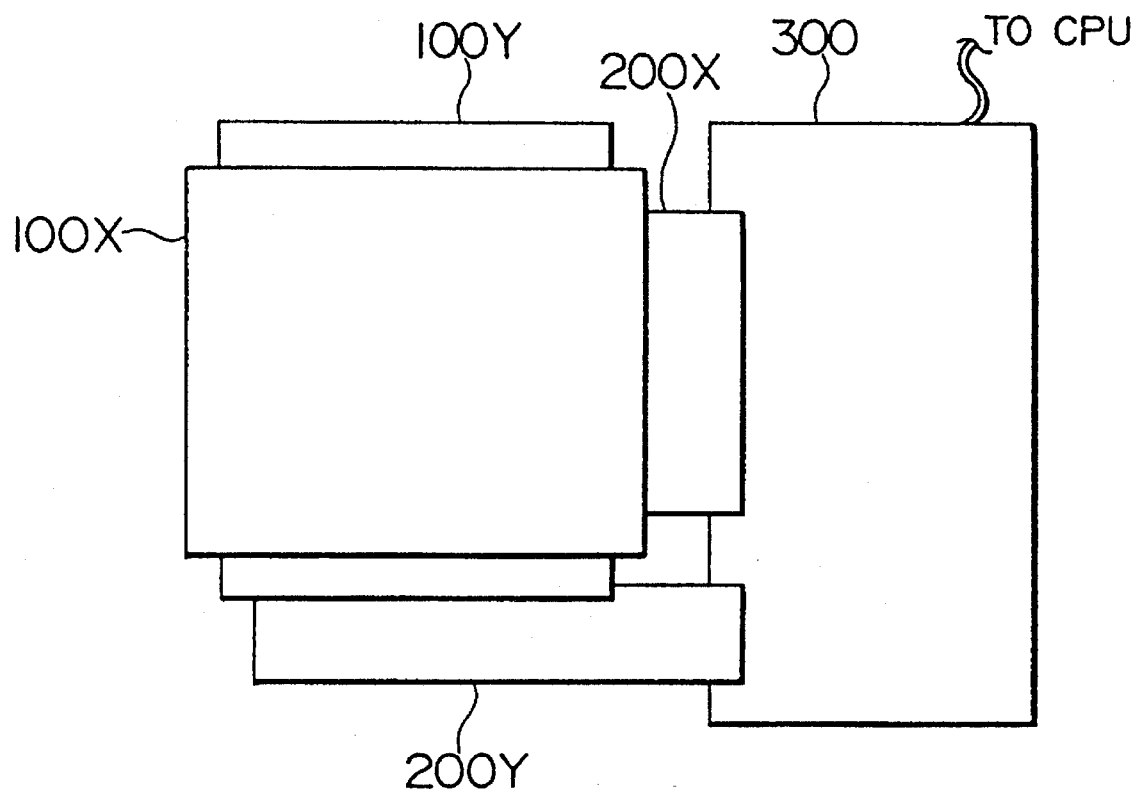
FIG. 12 is a schematic diagram of a tablet unit according to this invention.

FIG. 12 is a schematic diagram of a tablet unit according to this invention. The tablet unit comprises flexible sheets 100X and 100Y overlapping each other. The flexible sheet 100X has a plurality of X-axis magnetic wires and is folded back into a double-folded structure including upper and lower layers. Likewise, the flexible sheet 100Y has a plurality of Y-axis magnetic wires and is folded back into a double-folded structure including upper and lower layers. The flexible sheet 100X is connected to a first double-sided printed circuit board 200X having upper and under sides provided with the first and the second X-axis partial pattern groups. On the other hand, the flexible sheet 100Y is connected to a second double-sided printed circuit board 200Y having upper and under sides provided with first and second Y-axis partial pattern groups similar to the first and the second. X-axis partial pattern groups. The first and the second double-sided printed circuit boards 200X and 200Y are connected to a printed circuit board 300 having selection circuits and detection circuits for the X-axis and the Y-axis magnetic wires. The printed circuit board 300 is connected to the CPU through a cable. In addition, it is desirable that both the first and the second double-sided printed circuit boards 200X and 200Y are implemented by a single double-sided printed circuit board.

Although this invention has been described in conjunction with the several preferred embodiments, it will be understood that this invention is not restricted thereto. For example, the number of the magnetic wires and the number of groups can be selected to be any desired number.

What is claimed is:

1. A tablet unit comprising:

a plurality of X-axis magnetic wires and a plurality of Y-axis magnetic wires arranged at a predetermined pitch on a tablet board in a matrix fashion for detecting an abscissa and an ordinate, respectively, each of said plurality of X-axis and Y-axis magnetic wires being made of an amorphous material;

a switching circuit supplied with a selection signal for selectively putting said plurality of X-axis and Y-axis magnetic wires into an electroconductive state in accordance with said selection signal; and a detecting circuit connected to said plurality of X-axis and Y-axis magnetic wires for detecting a particular one of said plurality of X-axis magnetic wires and a particular one of said plurality of Y-axis magnetic wires when said particular ones are indicated as a coordinate by a coordinate indicator pen during said electroconductive state;

said plurality of X-axis magnetic wires being divided into first through N-th (N being an integer not smaller than two) groups, any one of said X-axis magnetic wires belonging to a particular group being arranged to adjoin two other X-axis magnetic wires belonging to different groups to form a specific combination of three different groups so that those X-axis magnetic wires belonging to said particular group are spaced from one another by at least a predetermined distance and that said specific combination is unique and does not repeatedly appear;

said plurality of Y-axis magnetic wires being divided into first through N-th (N being an integer not smaller than two) groups, any one of said Y-axis magnetic wires belonging to a particular group being arranged to adjoin two other Y-axis magnetic wires belonging to different groups to form a specific combination of three different groups so that those Y-axis magnetic wires belonging to said particular group are spaced from one another by at least said predetermined distance and that said specific combination is unique and does not repeatedly appear;

the X-axis magnetic wires belonging to each group being connected to one another in series or in parallel;

the Y-axis magnetic wires belonging to each group being connected to one another in series or in parallel;

said switching circuit successively and selectively putting said plurality of X-axis and Y-axis magnetic wires group by group into said electroconductive state in a predetermined cycle.

2. A tablet unit as claimed in claim 1, wherein said switching circuit includes first through N-th X-axis switching elements connected to those of said X-axis magnetic wires belonging to said first through said N-th groups, respectively, and first through N-th Y-axis switching elements connected to those of said Y-axis magnetic wires belonging to said first through said N-th groups, respectively, each of said X-axis and said Y-axis magnetic wires being put into said electroconductive state when a corresponding one of said X-axis and said Y-axis switching elements is turned into an on state in response to said selection signal.

3. A tablet unit as claimed in claim 2, wherein said plurality of X-axis and Y-axis magnetic wires are mounted on different flexible sheets, respectively, each of said flexible sheets being folded back at its center portion into a double-folded structure having an upper layer and a lower layer.

4. A tablet unit as claimed in claim 2, further comprising a double-sided printed circuit board having opposite surfaces respectively provided with X-axis wiring patterns for electrical connection between one ends of said plurality of X-axis magnetic wires and said switching circuit and between the other ends of said plurality of X-axis magnetic wires and said detecting circuit, said opposite surfaces being further provided with Y-axis wiring patterns, respectively, for electrical connection between one ends of said plurality of Y-axis magnetic wires and said switching circuit and between the other ends of said plurality of Y-axis magnetic wires and said detecting circuit.

5. A tablet unit as claimed in claim 4, wherein said X-axis wiring patterns formed on one surface of said double-sided printed circuit board comprise a first group of X-axis partial patterns formed in parallel to an extending direction of said plurality of X-axis magnetic wires, said X-axis wiring patterns formed on the other surface of said double-sided printed circuit board comprising a second group of X-axis partial patterns formed perpendicularly to said extending direction of the plurality of X-axis magnetic wires, said Y-axis wiring patterns formed on the one surface of said double-sided printed circuit board comprising a first group of Y-axis partial patterns formed in parallel to an extending direction of said plurality of Y-axis magnetic wires, said Y-axis wiring patterns formed on the other surface of said double-sided printed circuit board comprising a second group of Y-axis partial patterns formed perpendicularly to said extending direction of said plurality of Y-axis magnetic wires.

6. A tablet unit as claimed in claim 5, wherein said electrical connection is achieved by connecting respective ends of said first group of X-axis partial patterns and respective ends of said second group of X-axis partial patterns via a plurality of through holes penetrating through said double-sided printed circuit board and by connecting respective ends of said first group of Y-axis partial patterns and respective ends of said second group of Y-axis partial patterns via a plurality of through holes penetrating through said double-sided printed circuit board.

* * * * *